(12) United States Patent
Xiong et al.

(10) Patent No.: US 8,718,130 B2
(45) Date of Patent: May 6, 2014

(54) METHOD AND SYSTEM FOR UPSAMPLING A SPATIAL LAYERED CODED VIDEO IMAGE (75) Inventors: Lianhuan Xiong, Shenzhen (CN); Yihua Tan, Shenzhen (CN); Zhang Wang, Shenzhen (CN); Ajun Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1436 days.

(21) Appl. No.: 12/101,573

(22) Filed: Apr. 11, 2008

(65) Prior Publication Data

US 2008/0205513 A1 Aug. 28, 2008

Related U.S. Application Data

(63) Continuation of application No. PCT/CN2006/002672, filed on Oct. 11, 2006.

(30) Foreign Application Priority Data

Oct. 11, 2005 (CN) .......................... 2005 1 0030401

(51) Int. Cl.
*H04B 1/66* (2006.01)
*H04N 7/50* (2006.01)
*H04N 7/12* (2006.01)
*H04N 7/26* (2006.01)

(52) U.S. Cl.
CPC .............. *H04N 7/50* (2013.01); *H04N 7/26271* (2013.01)
USPC .................. 375/240.01; 375/240.12

(58) Field of Classification Search
CPC ................ H04N 19/00066; H04N 19/00084; H04N 19/00121; H04N 19/00266; H04N 19/00315; H04N 19/00436; H04N 19/00757; H04N 19/00781; H04N 19/00787; H04N 19/00818; H04N 19/00824
USPC ......... 348/420, 453, 452, 441, 443, 444, 446, 348/448, 449; 382/253, 233, 165, 166, 232, 382/235, 251; 375/240.01, 240.21, 240.12, 375/240.16, 240.1, 240.25, 240.2, 240.22, 375/240.24
See application file for complete search history.

(56) References Cited

U.S. PATENT DOCUMENTS 6,175,592 B1   1/2001   Kim et al.
6,184,935 B1   2/2001   Iaquinto et al.
(Continued)

FOREIGN PATENT DOCUMENTS

CN   1543221 A   11/2004
CN   1585495   2/2005
(Continued)

OTHER PUBLICATIONS

Khan, et al., "An efficient and scalable low bit-rate video coding with virtual SPIHT," Signal Processing: Image Communication, Mar. 2004, p. 267-283, vol. 19, No. 3.
(Continued)

*Primary Examiner* — Behrooz Senfi
(74) *Attorney, Agent, or Firm* — Slater & Matsil, L.L.P.

(57) ABSTRACT

The invention relates to video image compression technologies, and discloses a method and system for upsampling a spatial scalable coded video image so that during upsampling computation complexity may be reduced while coding performance is substantially unchanged. In the invention, the principle that human eyes are far less sensitive to a chrominance components than to a luminance components is utilized, and a simpler filter is adopted for the chrominance components than that for the luminance components during upsampling in I_BLINTRA_Base inter-layer prediction or residual samples image inter-layer prediction, thereby reducing effectively calculation complexity while coding performance is substantially unchanged.

2 Claims, 5 Drawing Sheets

(56) References Cited

U.S. PATENT DOCUMENTS

| | | | |
|---|---|---|---|
| 7,953,152 B1* | 5/2011 | Ameres et al. | 375/240.16 |
| 8,026,979 B2 | 9/2011 | Sun | |
| 8,265,151 B1* | 9/2012 | Wang et al. | 375/240.13 |
| 8,498,338 B1* | 7/2013 | Wang et al. | 375/240.13 |
| 2003/0112864 A1 | 6/2003 | Karczewicz et al. | |
| 2003/0190092 A1 | 10/2003 | Dyas et al. | |
| 2004/0032535 A1 | 2/2004 | Ogawa | |
| 2004/0120597 A1* | 6/2004 | Le Dinh | 382/261 |
| 2004/0190625 A1 | 9/2004 | He et al. | |
| 2004/0190626 A1 | 9/2004 | Sun et al. | |
| 2004/0190632 A1 | 9/2004 | Cismas | |
| 2004/0213470 A1* | 10/2004 | Sato et al. | 382/239 |
| 2005/0141617 A1 | 6/2005 | Kim et al. | |
| 2006/0210185 A1 | 9/2006 | Sun | |
| 2006/0268991 A1* | 11/2006 | Segall et al. | 375/240.24 |
| 2006/0294171 A1* | 12/2006 | Bossen et al. | 708/300 |
| 2007/0031065 A1* | 2/2007 | Sun | 382/299 |
| 2008/0267289 A1 | 10/2008 | Yu et al. | |
| 2008/0291997 A1* | 11/2008 | Yoon et al. | 375/240.12 |
| 2009/0034629 A1* | 2/2009 | Suh et al. | 375/240.27 |
| 2011/0286530 A1* | 11/2011 | Tian et al. | 375/240.25 |

FOREIGN PATENT DOCUMENTS

| | | |
|---|---|---|
| CN | 101313591 A | 11/2008 |
| CN | 101009842 B | 2/2012 |
| EP | 1542476 | 6/2005 |
| JP | 9-93486 | 4/1997 |
| JP | 10134175 A | 5/1998 |
| JP | 2005503734 A | 2/2005 |
| JP | 2005198292 | 7/2005 |
| JP | 2006295913 A | 10/2006 |
| JP | 2008533908 A | 8/2008 |
| JP | 2008538057 A | 10/2008 |
| JP | 2009516400 A | 4/2009 |

OTHER PUBLICATIONS

Japanese Office Action, Japanese Application No. 2008-549748, Applicant: Huawei Technologies Co., Ltd., et al., Mailing Date: Jul. 12, 2011, 14 pages.

Joint Video Team (JVT) of ISO/IEC MPEG & ITU-T VCEG (ISO/IEC JTC1/SC29/WG11 and ITU-T SG16 Q.6), "New Results on Adaptive Interpolation Filter," 3rd Meeting, Fairfax, Virginia, USA, JVT-C059, JVT-C059.doc, May 6-10, 2002, 15 pages.

Joint Video Team (JVT) of ISO/IEC MPEG & ITU-T VCEG (ISO/IEC JTC1/SC29/WG11 and ITU-T SG16 Q.6), "Extended Spatial Scalability with Picture-Level Adaptation," 15th Meeting, Busan, Korea, JVT-O008, JVT-O008.doc, Apr. 16-22, 2005, 22 pages.

Joint Video Team (JVT) of ISO/IEC MPEG & ITU-T VCEG (ISO/IEC JTC1/SC29/WG11 and ITU-T SG16 Q.6), "Direct Interpolation for Upsampling in Extended Spatial Scalability—Response to CE10 part 1," 16th Meeting, Poznan, Poland, JVT-P012, JVT-P012.doc, Jul. 25-29, 2005, 10 pages.

Joint Video Team (JVT) of ISO/IEC MPEG & ITU-T VCEG (ISO/IEC JTC1/SC29/WG11 and ITU-T SG16 Q.6), "Simplification of up-sampling process of IntraBL mode," 17th Meeting, Nice, France, JVT-Q078, JVT-Q078.doc, Oct. 14-21, 2005, 8 pages.

Joint Video Team (JVT) of ISO/IEC MPEG & ITU-T VCEG (ISO/IEC JTC1/SC29/WG11 and ITU-T SG16 Q.6), "Simplification of up-sampling process of IntraBL mode," 17th Meeting, Nice, France, JVT-Q078, JVT-Q078r1.doc, Oct. 14-21, 2005, 10 pages.

Joint Video Team (JVT) of ISO/IEC MPEG & ITU-T VCEG (ISO/IEC JTC1/SC29/WG11 and ITU-T SG16 Q.6), "New Results on Direct Interpolation for Upsampling in ESS," 17th Meeting, Nice, France, JVT-Q038, JVT-Q038.doc, Oct. 17-21, 2005, 11 pages.

Extended European Search Report, Application No./Patent No. 07702051.9-1522 / 1973350 PCT/CN2007/000119, dated Jul. 8, 2011, 9 pages.

Korean Notice of Office Action, Application No. 10-2008-7019508, dated Feb. 23, 2010, 7 pages.

Korean Notice of Decision for Final Rejection, Application No. 10-2008-7019508, dated Aug. 18, 2010, 5 pages.

First Chinese Office Action, Application No. 200710000228.0, dated Dec. 11, 2009, 8 pages.

International Telecommunication Union, "Series H: Audiovisisual and Multimedia Systems, Infrastructue of audiovisual services—Coding of moving video," ITU-T Telecommunication Standardization Sector of ITU, H.264, Advanced video coding for generic audiovisual services, May 2003, 272 pages.

Joint Video Team (JVT) of ISO/IEC MPEG & ITU-T VCEG (ISO/IEC JTC1/SC29/WG11 and ITU-T SG16 Q.6), "New downsampling and upsampling processes for chroma samples in SVC spatial scalability," 15th Meeting, Busan, Korea, JVT-O007, JVT-O077.doc, Apr. 16-22, 2005, 7 pages.

Joint Video Team (JVT) of ISO/IEC MPEG & ITU-T VCEG (ISO/IEC JTC1/SC29/WG11 and ITU-T SG16 Q.6), "Scalable Video Coding—Working Draft 3," 16th Meeting, Poznan, Poland, JVT-P201, JVT-P201-WD3.doc, Jul. 2005, 143 pages.

Joint Video Team (JVT) of ISO/IEC MPEG & ITU-T VCEG (ISO/IEC JTC1/SC29/WG11 and ITU-T SG16 Q.6), "Joint Scalable Video Model JSVM-3 Annex S," 16th Meeting, Poznan, Poland, JVT-P202, JVT-P202-JSVM-AnnexS_d0.doc, Jul. 2005, 144 pages.

Written Opinion of the International Searching Authority, PCT Application No. PCT/CN2006/002672, Applicant: Huawei Technologies Co., Ltd., et al., Mailing date: Jan. 25, 2007, 3 pages.

First Chinese Office Action, Application No. 200510030401.2, Mailing date: Jan. 4, 2008, 7 pages.

Second Chinese Office Action, Application No. 200510030401.2, Mailing date: Jun. 20, 2009, 7 pages.

First Chinese Office Action, Application No. 200910003364.4, Mailing date: Apr. 7, 2010, 6 pages.

First Chinese Office Action, Application No. 200780000221.7, dated Mar. 20, 2009, 8 pages.

Second Chinese Office Action, Application No. 200780000221.7, dated Oct. 23, 2009, 8 pages.

Written Opinion of the International Searching Authority, PCT Application No. PCT/CN2007/000119, Huawei Technologies Co., Ltd., et al., Mailing date: Apr. 19, 2007, 3 pages.

International Search Report, PCT Application No. PCT/CN2007/000119, Huawei Technologies Co., Ltd., et al., Mailing date: Apr. 19, 2007, 4 pages.

Core Experiment 7. Enhancement Layer Intra Prediction, JVT-0307r1, Jul. 1, 2005, 6 pages.

Joint Video Team (JVT) of ISO/IEC MPEG & ITU-T VCEG (ISO/IEC JTC1/SC29/WG11 and ITU-T SG16 Q.6), "New results on Simplification of Up-sampling process of INtraBL Mode," Document: JVT-R065, Filename: JVT-R065.doc, 18th Meeting: Bangkok, TH, Jan. 16-20, 2006, 8 pages.

Joint Video Team (JVT) of ISO/IEC MPEG & ITU-T VCEG (ISO/IEC JTC1/SC29/WG11 and ITU-T SG16 Q.6), "Spatial upsampling filter," Document: JVT-Q051, Filename: JVT_Q051, 17th Meeting: Nice, FR, Oct. 14-21, 2005, 6 pages.

Joint Video Team (JVT) of ISO/IEC MPEG & ITU-T VCEG (ISO/IEC JTC1/SC29/WG11 and ITU-T SG16 Q.6), "New downsampling and upsampling processes for chroma samples in SVC spatial scalability," Document: JVT-O077r1, Filename: Document2, 15th Meeting: Busan, KR, Apr. 16-22, 2005, 7 pages.

"Estimating Polyphase Filter Coefficients with a Windowed-Sinc Function," ZIPcores.com, Application Note: ZC003, Rev. 1.0, Jun. 3, 2009, 4 pages.

Francois, Edouard, et al., "Core Experiments on Extended Spatial Scalability (CE-10)," Joint Video Team (JVT) of ISO/IEC MPEG & ITU-T VCEG, Document JVT-O310, 15th Meeting: Busan, Korea, Apr. 16-22, 2005, 4 pages.

Francois, E., et al., "Generic Extended Spatial Scalability," Joint Video Team (JVT) of ISO/IEC MPEG & ITU-T VCEG, Document JVT-O041, 13th Meeting: Palma de Mallorca, Spain, Oct. 18-22, 2004, 36 pages.

(56) References Cited

OTHER PUBLICATIONS

Zhong, Sheng, et al., "Improved Sub-Pel Interpolation Filters," ITU-Telecommunications Standardization Sector, Study Group Question Q.6/SG16 (VCEG), Document VCEG-N51, 14th Meeting: Santa Barbara, California, Sep. 24-27, 2001, 3 pages.

Communication pursuant to Article 94(3) EPC received in Application No. 06791245.1-1908, Applicant: Huawei Technologies Co., Ltd., mailed Apr. 3, 2013, 6 pages.

Ying, Chen et al., "New downsampling and upsampling processes for chroma samples in SVC spatial scalability," Joint Video Team (JVT) of ISO/IEC MPEG & ITU-T VCEG, 15th Meeting, Busan, Korea, Apr. 16-22, 2005, 7 pages.

* cited by examiner

METHOD AND SYSTEM FOR UPSAMPLING A SPATIAL LAYERED CODED VIDEO IMAGE

CROSS REFERENCE TO RELATED APPLICATION

The present application is a continuation application of PCT application No. PCT/CN2006/002672, filed on Oct. 11, 2006, which claims the benefit of Chinese Patent Application No. 200510030401.2, filed on Oct. 11, 2005, both of which are incorporated by reference herein in its entirety.

FIELD

Embodiments of the present invention relates to video image compression technologies and in particular to a method and system for upsampling a spatial scalable coded video image.

BACKGROUND

The H.264 video compression coding standard is established jointly by the International Telecommunication Union—Telecommunication Standardization Section (ITU-T), the International Organization for Standardization (ISO) and the Moving Picture Expert Group (MPEG) of the International Electrician Commission (IEC).

Currently, the H.264 has gradually become a predominating standard in multimedia communication, and numerous multimedia real time communication products using the H.264 standard, e.g., a video conferencing, a video telephony, a $3^{rd}$ Generation (3G) mobile communication terminal, etc., and network streaming media products have emerged successively. It can be said that whether the H.264 can be supported has become a crucial factor of determining product competitiveness in the market field. Especially along with emergence of 3G mobile communication systems and rapid development of the Internet Protocol (IP), video network communication has gradually become one of dominant communication services.

Components and a transport mechanism of a message under the H.264 standard will be described briefly below.

A layered mode is adopted in the H.264 standard to define a video coding layer (VCL) and a network abstraction layer (NAL), and the NAL is designed specifically for network transmission and can be adapted to video transmission over different networks to further improve network affinity. The H.264 introduces an IP packet oriented coding mechanism, which is advantageous to packet transmission over a network, supports streaming media transmission of a video over the network and robust error resilience, especially of accommodating to requirements of wireless video transmission with a high packet loss ratio and serious interference. All of H.264 data to be transmitted, including image data and other messages, is encapsulated into packets of a uniform format for transmission, i.e., Network Abstraction Layer Units (NALU). Each NALU is a variable length character string in bytes of certain syntax elements and includes head information of one byte available for representing a data type, and payload data of several integer bytes. A NALU can carry a coded slice, various types of data segmentations or a set of sequence or image parameters. In order to enhance reliability of data, each frame of images is divided into several slices, each of which is carried in an NALU. A slice is further consisted of several smaller macroblocks and is a minimal processing unit. Generally, slices at corresponding locations in tandem frames are associated with each other, and slices at different locations are independent from each other, so that a code error can be prevented from diffusing between the slices.

H.264 data includes texture data of non-reference frames, sequence parameters, image parameters, Supplemental Enhancement Information (SEI), texture data of reference frames and so on. The SEI is a general designation of information playing an auxiliary role in H.264 video decoding, display and other aspects.

Figure 1:
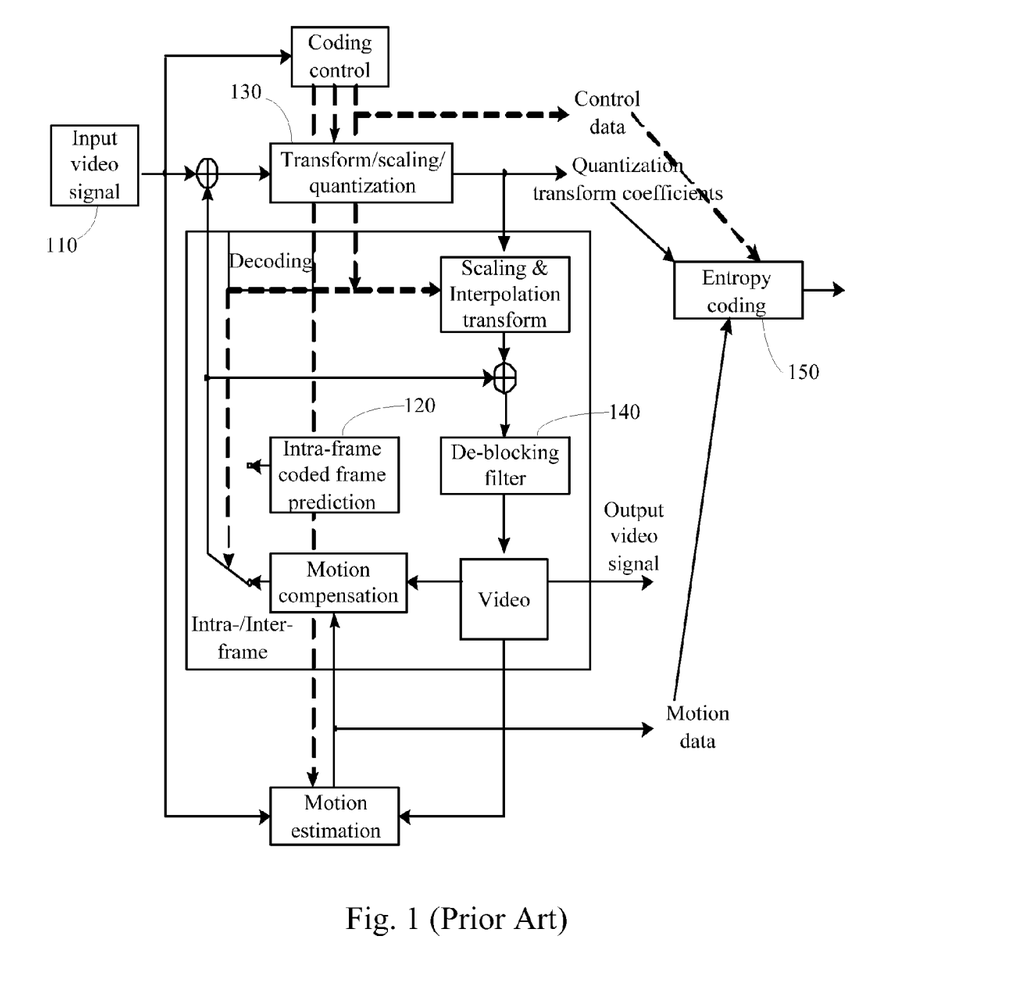
FIG. 1 is a schematic diagram of a H.264 compression processing framework in the prior art.

FIG. 1 illustrates a H.264 compression processing framework. A basic H.264 processing unit is a 16×16 macroblock 110, for which advanced techniques, such as multiple frame reference, intra-frame prediction 120, multiple macroblock type, 4×4 integer transform and quantization 130, loop filter 140, ¼-pel accuracy motion estimation prediction, Context-based Adaptive Variable Length Coding (CAVLC), Context Adaptive Binary Arithmetic Coding (CABAC), entropy coding 150, etc., are adopted, therefore, H.264 compression efficiency can be improved to more than a double of that of MPEG-2, H.263 and MPEG-4 ASP.

During establishing the H.264 scalable coding standard, the Joint Video Team (JVT) makes a basic layer compatible with a H.264 Main Profile and uses an algorithm framework of Motion Compensated Temporal Filter (MCTF), so that functions such as spatial scalability, temporal scalability, quality or SNR scalability, complexity scalability, etc., can be implemented very well.

Figure 2:
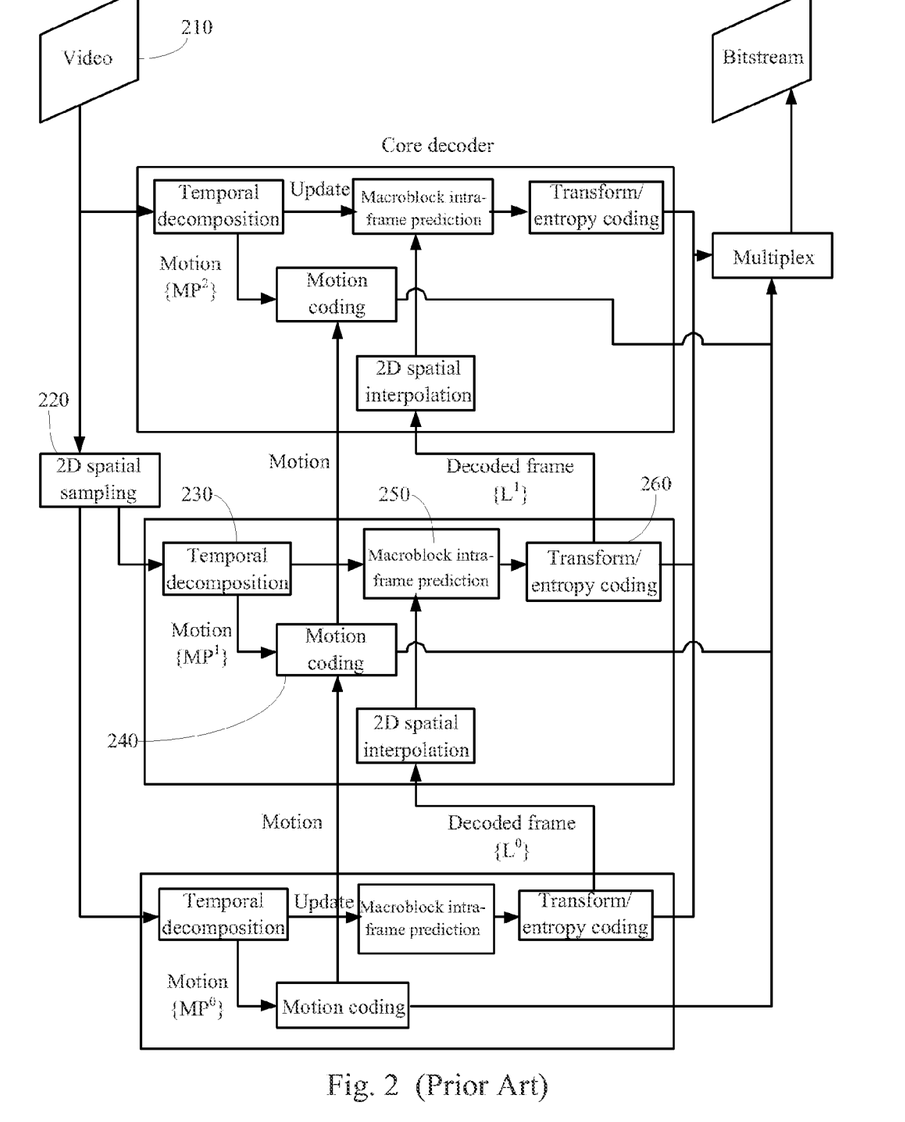
FIG. 2 is a block diagram of an SVC algorithm in the prior art.

The latest reference model of the Joint Video Team Scalable Video Coding (JVT SVC) is the Joint Scalable Video Model 3 (JSVM3). FIG. 2 illustrates a block diagram of the above SVC algorithm. Input video data (210) is received, 2-dimensional (2D) spatial sampling (220) is performed thereon, and operations such as temporal decomposition (230), motion coding (240), macroblock intra-frame prediction (250), transform/entropy coding (260), etc., are performed in a core decoder.

Figure 3:
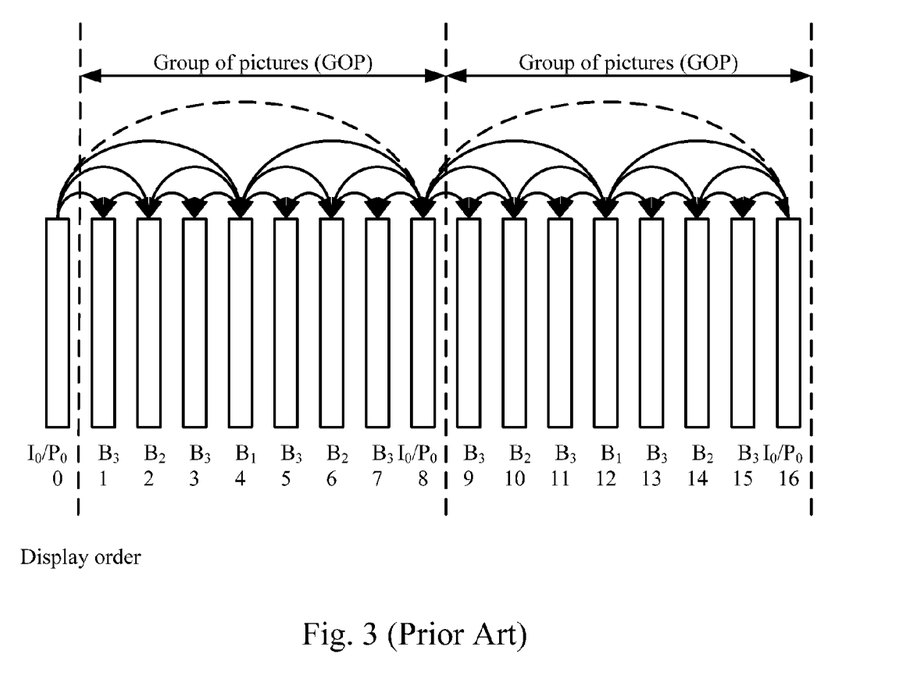
FIG. 3 is a block diagram of B frame based decomposition in the prior art.
Figure 4:
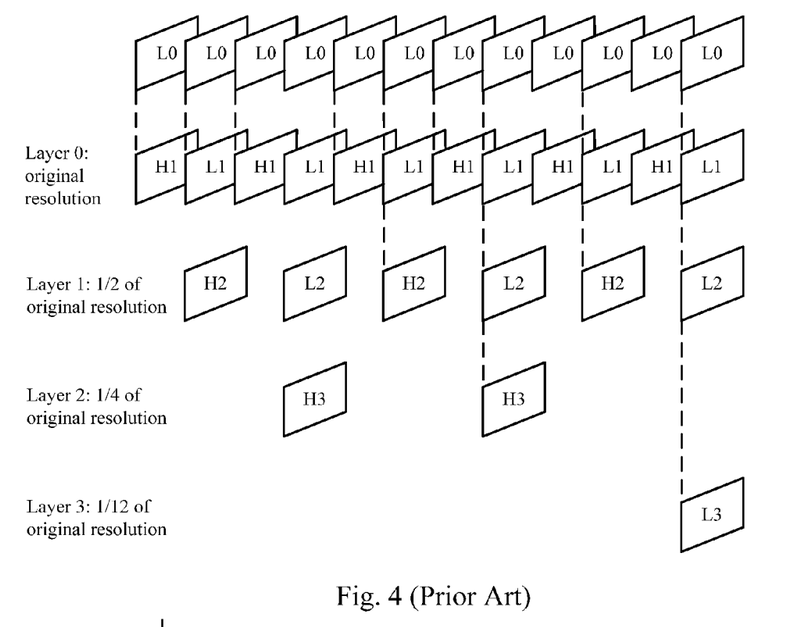
FIG. 4 is a block diagram of MCTF based decomposition in the prior art.

It shall be noted that a temporal decomposition process can adopt a B frame decomposition based method as illustrated in FIG. 3 or a MCTF decomposition based method as illustrated in FIG. 4, in which the resolution at Layer 0 is an original frame rate, and those at Layers 3, 2, 1 are ½, ¼ and 1/12 of the original frame rate, respectively.

Figure 5:
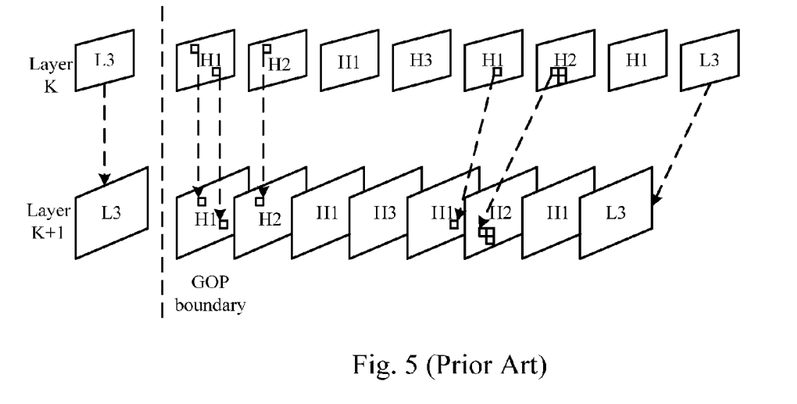
FIG. 5 is a schematic diagram of an I_BL prediction mode at an enhanced layer in the prior art.

In terms of intra-frame prediction, a H.264 intra-frame prediction method is adopted for a JSVM3 basic layer. A prediction mode, I_BL, in which a macroblock at the present layer is predicated pixel by pixel from a corresponding macroblock at a lower layer, is added based upon a H.264 prediction mode for an enhanced layer. As illustrated in FIG. 5, macroblocks H1, H2, H3, etc., at Layer K+1 are predicated pixel by pixel from corresponding macroblocks H1, H2, H3, etc., at Layer K.

Furthermore, a macroblock residual image at an enhanced layer, i.e., a difference image after subtractive prediction, can be predicated from a residual image of a corresponding macroblock at a basic or lower layer in a similar way to the I_BL.

For spatial scalable coding, the corresponding macroblock at the basic or lower layer has to be subject to an upsampling process in I_BL prediction or residual image prediction at the enhanced layer. Upsampling is a kind of re-sampling for scaling up or down a sampled signal. Assume that original sampling points are located at integer coordinates (0, 1, 2 . . . ) and a distance between new sampling points after re-sampling is denoted by a, then it is referred to as down-sampling if a>1, otherwise upsampling if a<1.

In the prior art, an upsampling filter in I-BL prediction is a relatively complex [1 −5 20 20 −5 1]/32 filter, that in the residual image prediction is a [1 1]/2 filter, and the same filter is adopted for luminance and chrominance images.

In a practical application, the above solution has the following drawback: in an upsampling process in I-BL prediction, the same relatively complex 6-order filter is adopted for a chrominance component as for a luminance component, and consequently calculation complexity in the upsampling process of the chrominance component may be too high.

Furthermore, the [1 1]/2 filter adopted in the upsampling process in residual image predication is too simple, and consequently this may influence coding performance.

That is, in the prior art, when up-sampling a spatial scalable coded video image, the difference between a chrominance component and a luminance component has not been considered, and calculation complexity and coding performance have not been considered comprehensively, thus some problems, for example, high calculation complexity or poor calculation performance, arise in spatial scalable coding of a video image.

SUMMARY

Embodiments of the present invention provide a method and system for upsampling a spatial scalable coded video image so that in an upsampling process, calculation complexity and coding performance are considered comprehensively to guarantee the calculation complexity and the coding performance.

According to an aspect of the invention, a method for upsampling a spatial scalable coded video image includes upsampling a luminance component and a chrominance component of an image layer respectively, in which a first filter is used to upsample the luminance component of the image layer and a second filter with an order lower than that of the first filter is used to upsample the chrominance component of the image layer.

Optionally, the upsampling is upsampling of a macroblock at a lower layer in "I_BL" inter-layer prediction or residual image inter-layer prediction.

Optionally, during upsampling in the "I_BL" inter-layer prediction, the first filter is a 6-order filter and the second filter is a 4- or 2-order filter.

Optionally, the 6-order filter is a [1 −5 20 20 −5 1]/32 filter, the 4-order filter is a [−1 5 5 −1]/8 filter, and the 2-order filter is a [1 1]/2 filter.

Optionally, during upsampling in the residual image inter-layer prediction, the first filter is a [−1 5 5-1]/8 filter and the second filter is a [1 1]/2 filter.

According to another aspect of the invention, a system for upsampling a spatial scalable coded video image includes at least a first filter adapted to upsample a luminance component of an image layer and a second filter adapted to upsample a chrominance component of the image layer, in which the second filter has an order lower than that of the first filter.

Optionally, the upsampling is upsampling of a macroblock at a lower layer in "I_BL" inter-layer prediction or residual image inter-layer prediction.

Optionally, when applied to the upsampling in the "I_BL" inter-layer prediction, the first filter is a 6-order filter and the second filter is a 4- or 2-order filter.

Optionally, the 6-order filter is a [1 −5 20 20 −5 1]/32 filter, the 4-order filter is a [−1 5 5 −1]/8 filter, and the 2-order filter is a [1 1]/2 filter.

Optionally, when be applied to the upsampling in the residual image inter-layer prediction, the first filter is a [−1 5 5-1]/8 filter and the second filter is a [1 1]/2 filter.

In this embodiment of the present invention, with use of the principle that human eyes are far less sensitive to a chrominance component than to a luminance component, a simpler filter is adopted for the chrominance component than that for the luminance component during upsampling in I_BL inter-layer prediction or residual image inter-layer prediction to thereby reduce effectively calculation complexity while coding performance is substantially unchanged.

DETAILED DESCRIPTION

Embodiments of the present invention will be further described in detail hereinafter with reference to the accompanying drawings to make the objects, aspects and advantages thereof more apparent.

Figure 6:
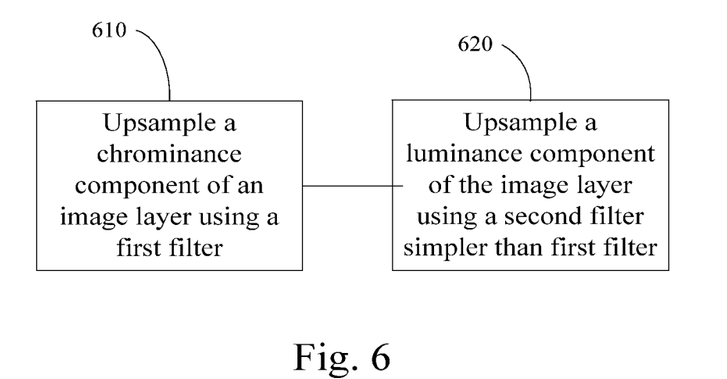
FIG. 6 is a flow chart of an embodiment of an upsampling method according to an embodiment of the present invention.

Embodiments of the present invention are based upon the natural rule that human eyes are far less sensitive to a chrominance component than to a luminance component. In an upsampling process, different filters are adopted to upsample a chrominance component and a luminance component in a way that the filter for the chrominance component is simpler than that for the luminance component. Referring to FIG. 6, in an upsampling process, a first filter is adopted to upsample a chrominance component of an image layer (block 610) and a second filter is adopted to upsample a luminance component of the image layer (block 620). The second filter is simpler than the first filter, which may mean that the order of the second filter is lower than that of the first filter.

Calculation complexity of the chrominance component will be reduced accordingly, and thus a workload of a calculation device will be reduced, so that more traffic can be borne on the same apparatus to make a processing delay smaller and bring fluent pictures.

In scalable coding of a video image, a coding process at an enhanced layer needs to make full use of information from a base or lower layer to remove redundancy and improve coding efficiency. For example, the SVC adopts schemes of I_BL inter-layer prediction, residual image inter-layer prediction, motion vector inter-layer prediction and so on.

For spatial scalable coding, a corresponding macroblock at a base or lower layer shall be subject to an upsampling process during performing I-BL prediction or residual image prediction at an enhanced layer to facilitate prediction.

In a first embodiment of the invention, different filters are adopted for upsampling a luminance component and a chrominance component in I_BL prediction in a way that a 6-order filter, e.g., a [1 −5 20 20 −5 1]/32 filter, is used as the filter for upsampling the luminance component, and a simpler 4-order filter, e.g., a [1 −5 −5 1]/8 filter is used as the filter for upsampling the chrominance component. During using the [1 −5 20 20 −5 1]/32 filter, 6 multiplication operations, 5 addition operations and 1 division operation are needed for calculation of each sampling point, whereas during using the [1 −5 −5 1]/8 filter, 4 multiplication operations, 3 addition operations and 1 division operation are needed for calculation of each sampling point, resulting in a reduced calculation amount approximately by one-third. Since human eyes are less sensitive to the chrominance component, large difference will not be perceived visually in practice.

In a second embodiment of the invention, different filters are also adopted to upsample a luminance component and a chrominance component, for example, a [−1 5 5 −1]/8 filter is adopted to upsample the luminance component and a [1 1]/2 filter is adopted to upsample the chrominance component. In this embodiment, the [−1 5 5 −1]/8 filter of a higher order is adopted for the luminance component, and this can improve coding performance while an increase in calculation complexity falls within an acceptable range. If the [−1 5 5 −1]/8 filter is also adopted for the chrominance component, then 4 multiplication operations, 3 addition operations and 1 division operation are needed for calculation of each sampling point. But now in use of the [1 1]/2 filter, only 1 addition operation and 1 division operation are needed. Considering that a division operation by an integer power of 2 can be replaced with a faster shift operation, the amount of operations may be reduced by an order of magnitude relative to the [−1 5 5 −1]/8 filter.

In a third embodiment of the invention, the [−1 5 5 −1]/8 filter is adopted for both a luminance component and a chrominance component in an upsampling process of residual images in order to improve coding performance.

Embodiments of the present invention conduct emulation tests on some typical sequences in order to demonstrate effectiveness of the filter.

The following table presents performance comparison between test results of quarter common intermediate format (QCIF) and common intermediate format (CIF) two-layer coding of 300 frames of images in a Harbour sequence, in which the test results of embodiments of the invention are obtained when using a [−1 5 5 −1]/8 filter for upsampling a chrominance component in I_BL prediction and using a [−1 5 5 −1]/8 filter for upsampling a luminance component and a chrominance component in residual image prediction.

|    | Results in the prior art | | | | Results according to embodiments of the invention | | | |
| --- | --- | --- | --- | --- | --- | --- | --- | --- |
| QP | Code rate | Y | Cb | Cr | Code rate | Y | Cb | Cr |
| 8  | 59496.902 | 50.7719 | 52.0737 | 52.632  | 59095.658 | 50.7719 | 52.0702 | 52.6277 |
| 12 | 43774.38  | 47.5296 | 49.3939 | 50.1502 | 43404.455 | 47.527  | 49.3866 | 50.14   |
| 16 | 30060.991 | 44.475  | 47.3343 | 48.4443 | 29752.754 | 44.474  | 47.3262 | 48.4323 |
| 20 | 19368.697 | 41.399  | 45.8185 | 47.3728 | 19133.755 | 41.3966 | 45.8097 | 47.3585 |
| 24 | 11262.018 | 28.4222 | 44.5876 | 46.5447 | 11124.914 | 38.4233 | 44.5841 | 46.5474 |
| 28 | 5870.7624 | 35.6978 | 43.3869 | 45.5161 | 5799.3328 | 35.6983 | 43.378  | 45.5082 |
| 32 | 2873.7904 | 33.2981 | 42.2992 | 44.3998 | 2847.3504 | 33.3022 | 42.3175 | 44.4073 |
| 36 | 1412.7112 | 31.1973 | 41.2843 | 43.2547 | 1403.5464 | 31.1975 | 41.2769 | 43.247  |

The test results show that with the use of embodiments of the invention, the code rate has been reduced while the PSNR value (Y) of the luminance component signal to noise ratio has been increased and the PNSR values (Cb and Cr) of the chrominance component signal to noise ratio have been identical by and large, so that coding performance has been improved.

It shall be noted that the above embodiments are merely some typical applications of the solutions of the invention. In addition to the above [−1 5 5 −1]/8 filter, other filters, for example, a 2-order filter such as a [1 1]/2 filter, can also be adopted for upsampling the chrominance component in the I_BL upsampling process, and other filters can also be adopted for upsampling the luminance and chrominance components in the residual image upsampling process.

Figure 7:
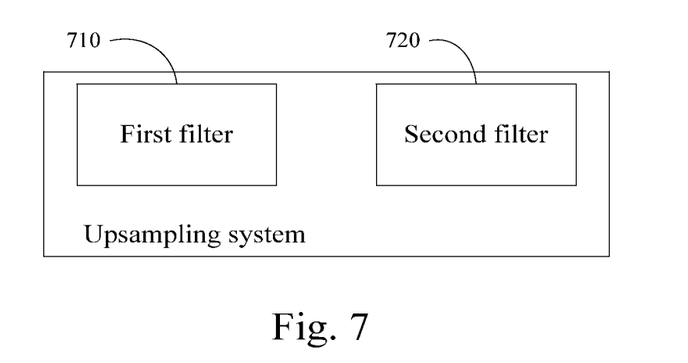
FIG. 7 is a schematic diagram of an embodiment of an upsampling system according to an embodiment of the present invention.

Referring to FIG. 7, it is a schematic diagram of a system for upsampling a spatial scalable coded video image according to embodiments of the invention. This upsampling system includes a first filter 710 and a second filter 720.

The first filter 710 is adapted to upsample a chrominance component of an image layer and the second filter 720 is adapted to upsample a luminance component of the image layer. The second filter 720 is simpler than the first filter 710, which may mean that the order of the second filter 720 is lower than that of the first filter 710.

When applied to upsampling in "I_BL" inter-layer prediction, the first filter 710 may be a 6-order filter, e.g., a [1 −5 20 20 −5 1]/32 filter, and the second filter 720 may be a 4-order filter, e.g., a [−1 5 5 −1]/8 filter. The second filter 720 can also be a 2-order filter, e.g., a [1 1]/2 filter.

When applied to upsampling in residual image inter-layer prediction, the first filter 710 may be a [−1 5 5 −1]/8 filter, and the second filter 720 may be a [1 1]/2 filter.

Although embodiments of the invention has been illustrated and described with reference to some preferred embodiments of the invention, those ordinarily skilled in the art shall appreciate that various changes can be made thereto in forms and details without departing from the spirit and scope of the invention.

What is claimed is:

1. A method for upsampling a spatial scalable coded video image to predict an enhanced layer from a base layer, the method comprising upsampling a luminance component and a chrominance component of the base layer, respectively, wherein a [−1 5 5 −1]/8 filter is used to upsample the luminance component of the base layer to predict the luminance component of the enhanced layer and a [1 1]/2 filter is used to upsample the chrominance component of the base layer to predict the chrominance component of the enhanced layer.

2. A system for upsampling a spatial scalable coded video image to predict an enhanced layer from a base layer, the system comprising:
- a [−1 5 5 −1]/8 filter adapted to upsample a luminance component of the base layer to predict the luminance component of the enhanced layer; and
- a [1 1]/2 filter adapted to upsample a chrominance component of the base layer to predict the chrominance component of the enhanced layer.

* * * * *